US008646814B2

(12) United States Patent
Lippka et al.

(10) Patent No.: US 8,646,814 B2
(45) Date of Patent: Feb. 11, 2014

(54) COUPLING GASKETS AND ASSOCIATED METHODS

(75) Inventors: Sandra M. Lippka, Warwick, RI (US); Michael Horgan, East Greenwich, RI (US)

(73) Assignee: Anvil International LLC, Atlanta, GA (US)

( * ) Notice: Subject to any disclaimer, the term of this patent is extended or adjusted under 35 U.S.C. 154(b) by 521 days.

(21) Appl. No.: 12/245,189

(22) Filed: Oct. 3, 2008

(65) Prior Publication Data

US 2009/0146417 A1 Jun. 11, 2009

Related U.S. Application Data

(60) Provisional application No. 60/977,227, filed on Oct. 3, 2007.

(51) Int. Cl.
*F16L 25/00* (2006.01)

(52) U.S. Cl.
USPC ........... 285/421; 285/910; 277/608; 277/615; 277/648

(58) Field of Classification Search
USPC ................ 285/148.17, 255, 364, 421, 910; 277/607–609, 615, 616, 626–627, 630, 277/644, 648
See application file for complete search history.

(56) References Cited

U.S. PATENT DOCUMENTS

| 1,541,601 | A | * | 6/1925 | Tribe | 285/112 |
| 1,867,891 | A | * | 7/1932 | Reynolds | 277/616 |
| 1,930,194 | A | | 10/1933 | Dillon | |
| 1,967,466 | A | * | 7/1934 | Damsel | 285/110 |
| 2,449,795 | A | | 9/1948 | Sillwagon | |
| 3,046,028 | A | | 7/1962 | Nathan | |
| 3,351,352 | A | | 11/1967 | Blakeley et al. | |
| 3,479,066 | A | | 11/1969 | Gittleman | |
| 3,680,894 | A | * | 8/1972 | Young | 285/112 |
| 3,761,114 | A | | 9/1973 | Blakeley | |
| 3,967,837 | A | * | 7/1976 | Westerlund et al. | 285/112 |
| 3,977,705 | A | * | 8/1976 | Thiessen et al. | 285/112 |
| 3,998,478 | A | | 12/1976 | Zopfi | |
| 4,311,248 | A | * | 1/1982 | Westerlund et al. | 277/626 |
| 4,487,421 | A | | 12/1984 | Housas et al. | |
| 4,629,217 | A | * | 12/1986 | Straub | 285/112 |
| 4,659,870 | A | * | 4/1987 | Jones | 174/84 S |
| 4,664,421 | A | | 5/1987 | Jones | |
| 4,671,541 | A | * | 6/1987 | Webb et al. | 285/112 |
| 4,726,611 | A | * | 2/1988 | Sauer | 285/110 |

(Continued)

FOREIGN PATENT DOCUMENTS

| DE | 2607983 | 9/1977 |
| FR | 2184203 | 12/1973 |
| GB | 734385 | 7/1955 |
| WO | 2009045525 | 4/2009 |

OTHER PUBLICATIONS

Photograph of cross-section of Victaulic gasket taken prior to Oct. 3, 2007 and publicly known prior to Oct. 3, 2007.

(Continued)

*Primary Examiner* — David E Bochna
*Assistant Examiner* — Gwendolyn Driggers
(74) *Attorney, Agent, or Firm* — Taylor English Duma LLP

(57) ABSTRACT

Coupling devices for joining pipe ends include annular gaskets. Example gaskets include pipe interface profiles for sealing performance and manufacturability.

10 Claims, 7 Drawing Sheets

(56) References Cited

U.S. PATENT DOCUMENTS

| | | | | |
|---|---|---|---|---|
| 4,779,903 | A | * | 10/1988 | Maier et al. .................. 285/336 |
| 4,915,418 | A | * | 4/1990 | Palatchy ......................... 285/24 |
| 5,056,833 | A | | 10/1991 | Webb et al. |
| 5,058,907 | A | | 10/1991 | Percebois et al. |
| 5,169,161 | A | | 12/1992 | Jones |
| 5,249,829 | A | | 10/1993 | Hendrickson |
| 5,722,666 | A | | 3/1998 | Sisk |
| 5,843,597 | A | | 12/1998 | Getz |
| 7,086,131 | B2 | * | 8/2006 | Gibb et al. .................... 29/282 |
| 7,401,819 | B2 | * | 7/2008 | Gibb et al. .................... 285/373 |
| 2005/0253383 | A1 | | 11/2005 | Gibb |
| 2007/0040336 | A1 | * | 2/2007 | Sun et al. ..................... 277/608 |

OTHER PUBLICATIONS

International Search Report and Written Opinion dated Apr. 9, 2009, Application No. PCT/US2008/11486, filed Oct. 3, 2008.
Lippka, Sandra M.; Canadian Office Action for serial No. 2,705,351, filed Oct. 3, 2008, mailed Jan. 23, 2013, 3 pgs.
Lippka, Sandra M.; Final Office Action for U.S. Appl. No. 13/098,866, filed May 2, 2011, mailed Mar. 12, 2013, 13 pgs.
International Preliminary Report on Patentability for serial No. PCT/US2008/011486, filed Oct. 3, 2008, mailed Jan. 18, 2010, 11 pgs.
Lippka, Sandra M.; Canadian Office Action for serial No. 2,705,351, filed Oct. 3, 2008, mailed Mar. 14, 2012, 3 pgs.
Lippka, Sandra M.; Non-Final Office Action for U.S. Appl. No. 13/098,866, filed May 2, 2011, mailed Aug. 29, 2012; 20 pgs.
Lippka, Sandra; Applicant Initiated Interview Summary for U.S. Appl. No. 13/098,866, filed May 2, 2011, mailed Apr. 13, 2012; 3 pgs.
Lippka, Sandra M.; U.S. Patent Application Entitled: Coupling Gaskets and Associated Methods; U.S. Appl. No. 13/098,866, filed May 2, 2011; 19 pages.
Lippka, Sandra M.; Non-Final Office Action for U.S. Appl. No. 13/098,866, filed May 2, 2011; mailed Jun. 27, 2011; 9 pages.
Lippka, Sandra M.; U.S. Provisional Patent Application Entitled: Coupling Gaskets and Associated Methods, U.S. Appl. No. 60/977,227, filed Oct. 3, 2007, 17 Pages.
Lippka, Sandra M.; PCT Application Entitled: Coupling Gaskets and Associated Methods, Serial No. PCT/US08/011486, filed Oct. 3, 2008, 21 pages.
Lippka, Sandra M.; Canadian Patent Application Entitled: Coupling Gaskets and Associated Methods, Serial No. 2,705,351, filed Oct. 3, 2008, 22 pages.
Lippka, Sandra M.; Final Office Action for U.S. Appl. No. 13/098,866, filed May 2, 2011; mailed Jan. 10, 2012; 10 pages.
Lippka, Sandra M.; Non-Final Office Action for U.S. Appl. No. 13/098,866, filed May 2, 2011, mailed Sep. 25, 2013, 14 pgs.

* cited by examiner

COUPLING GASKETS AND ASSOCIATED METHODS

CROSS-REFERENCE TO RELATED APPLICATIONS

This application claims priority to Provisional Patent Application No. 60/977,227, filed Oct. 3, 2007, which is hereby incorporated herein in its entirety by reference.

BACKGROUND OF THE INVENTION

1. Field of the Invention

Embodiments of the present invention generally relate to coupling devices used to join sections of pipe and more particularly, to improvements in the gaskets used in various pipe coupling devices.

2. Description of Related Art

A common type of pipe coupling device used to join two pipes employs a housing with a C-shaped gasket that is designed to straddle the joint between the pipes. The portions of the gasket that resiliently contact the outer surface of each pipe are often referred to as "sealing lips." The C-shaped gasket design can provide an effective seal in both vacuum and pressure applications. A cavity created by the inner surface of the C-shaped gasket functions as a pressure reservoir. In positive pressure applications, pressure within the piping system is applied to the internal surfaces of the gasket via the cavity formed by the gasket. This positive pressure increases the force of the sealing lips against the pipe surfaces. In a vacuum environment, the sealing lips are drawn tighter against the pipe surfaces due to the difference in pressure between the piping system and atmospheric pressure.

One benefit of these types of coupling devices is that they allow for limited expansion and contraction of the pipes in the axial direction, while maintaining contact between the sealing lips and each pipe's outside surface. Movement of the gasket relative to the pipe surfaces can also occur with pressure changes in the piping system. Over time, relative movement between the pipes and the gasket can wear the gasket sealing lips, which can result in leaks. One known solution to this problem is to apply a lubricant, such as grease, to the sealing lips during the installation process to reduce wear on the sealing lips. Although this has improved the performance of the gaskets, additional improvements are needed because the grease can be displaced over time thereby allowing the seals to wear. An additional issue with prior art designs is that gaskets can become damaged during installation.

BRIEF SUMMARY OF THE INVENTION

Various embodiments of the present invention address issues experienced with known coupling devices, some of which are identified above. In one embodiment, a coupling for joining two pipes positioned end to end in substantial axial alignment is provided. The coupling device includes: a housing having a plurality of segments configured to straddle the joint, wherein the housing defines an annular groove; a plurality of fasteners configured to connect the plurality of segments; and an annular gasket with a substantially C-shaped cross-section that defines a housing interface portion configured to engage the annular groove defined by the housing and two sealing portions directed inwardly and configured to engage respective outer surfaces of the two pipes, wherein each of the sealing portions includes at least one tapered rib having a vertical component and a horizontal component wherein the vertical component is substantially perpendicular to the horizontal component.

In another embodiment, an annular gasket is provided. The annular gasket has a substantially C-shaped cross-section that defines a housing interface portion formed on the outer surface of the C-shaped cross-section and two sealing portions formed on the outer surface of the C-shaped cross-section proximate the respective termination portions of the C-shaped cross section, wherein each of the sealing portions includes at least one tapered rib that includes a vertical component and a horizontal component and wherein the vertical component is substantially perpendicular to the horizontal component.

In a further embodiment, an asymmetrical annular gasket is provided. The asymmetrical gasket includes: a substantially L-shaped housing interface portion defining a first leg and a second leg; a pipe sealing portion extending substantially perpendicularly from said first leg and including a sealing portion defining at least one tapered rib configured to engage an annular surface; and a flange sealing portion extending substantially perpendicularly from said second leg and configured to engage a flat surface.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 13 A-E are schematic diagrams illustrating cross-sections of different types of couplings devices that may include a gasket having a tapered rib design in accordance with embodiments of the present invention.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Various embodiments of the present invention provide improved coupling devices for joining pipe ends that have improved sealing performance and/or manufacturability over known pipe coupling devices. One of the improvements provided by various embodiments of the present invention is a unique design of the gasket. Various embodiments of the gasket include an innovative pipe interface profile that improves the manufacturability of the gasket itself and its sealing performance. Specifically, the pipe interface includes one or more tapered ribs with a geometry that allows the use of less complex molds to manufacture the gasket and also aids in distributing lubricant during the life of the gasket thereby providing improved sealing performance. The following paragraphs describe embodiments of the present invention in relation to a gasket having a C-shaped cross-section; however, it should be understood that concepts described herein may be used in conjunction with other types of gaskets.

Figure 1:
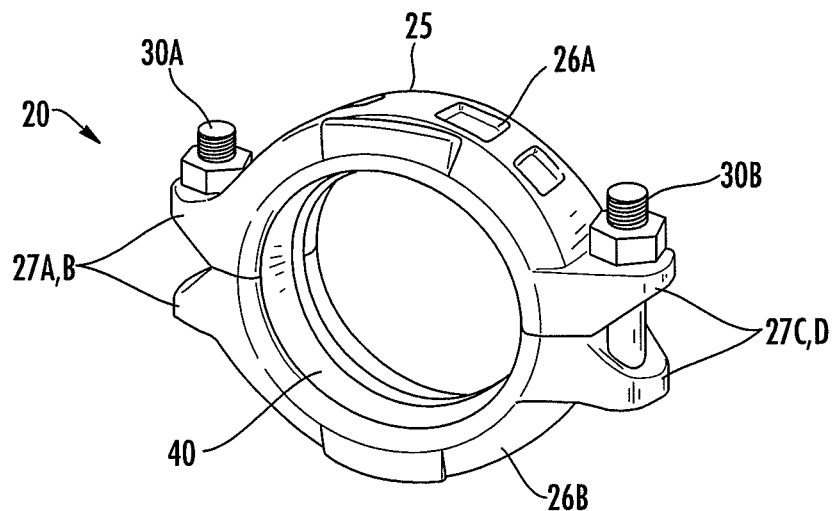
FIG. 1 is a pictorial view of a coupling device 20 in accordance with an embodiment of the present invention.

FIG. 1 illustrates a coupling device 20 in accordance with an embodiment of the present invention. The illustrated device 20 includes a housing 25, two fasteners 30A,B, and a gasket 40. In various embodiments, the housing 25 includes two segments 26A,B, which cooperate to form a cylinder. The housing segments include flanges 27A-D that are configured to receive fasteners 30A,B and facilitate connection of the segments. It should be understood that other embodiments of the present invention may include more than two segments to create the cylinder. As will be appreciated by those skilled in the art, couplings for large pipe diameters often include a greater number of segments to facilitate installation.

The housing 25 may be constructed of grey iron, ductile iron, steel alloys, or other suitable material. The housing 25 may be plated with zinc or other materials such as paint to inhibit corrosion.

Figure 2:
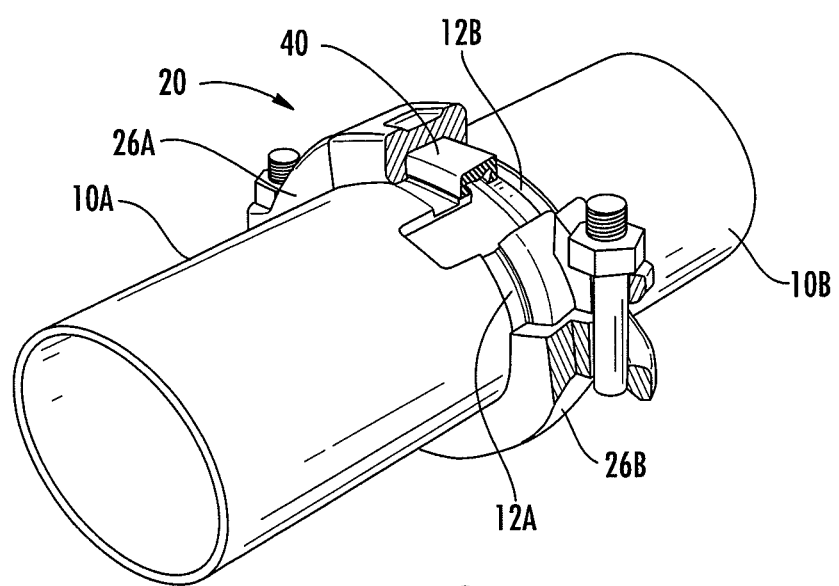
FIG. 2 is a partial cut-away pictorial view of a coupling device 20 joining two pipes in accordance with an embodiment of the present invention.

FIG. 2 illustrates how the coupling device 20 connects two pipes 10A,B. Generally, the two pipes to be joined are positioned end to end and in substantial axial alignment. Typically, the pipe ends are spaced apart, but they may be in contact if desired. The pipes 10A,B include grooves 12A,B formed or cut into each pipe's outer surface proximate the ends to facilitate attachment of the coupling device 20 to the pipes 10A,B. Generally, the gasket 40 is positioned such that it straddles the joint between the pipes. The housing segments 26A,B are then placed over the gasket and secured together using fasteners.

Figure 3:
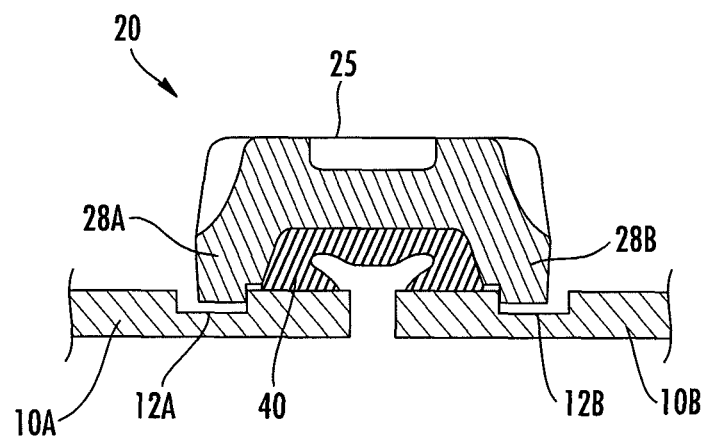
FIG. 3 is a schematic diagram showing a cross-section of a portion of a coupling device 20 and portions of two pipes.
Figure 4:
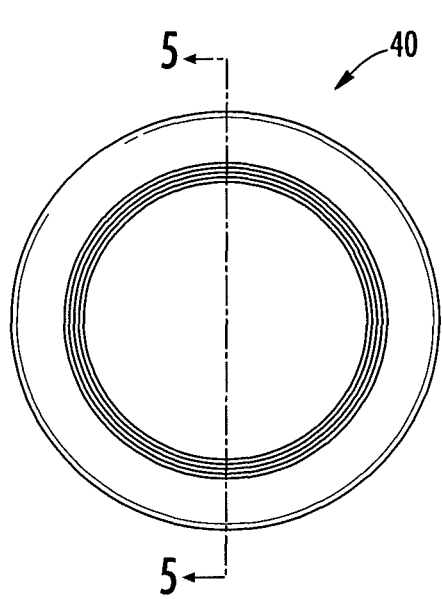
FIG. 4 is a top view of a gasket 40 in accordance with an embodiment of the present invention.
Figure 5:
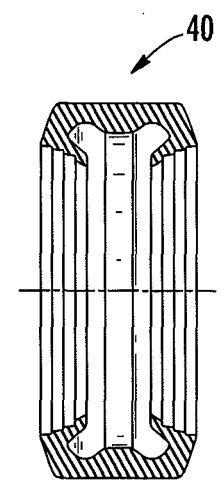
FIG. 5 is a cross-section view of the gasket 40 shown in FIG. 4.

FIG. 3 provides a schematic of a cross-section of a portion of the pipes 10A,B and the coupling device 20. As illustrated, the cross-section of the housing 25 is substantially U-shaped with one leg 28A of the "U" engaging a groove 12A in pipe 10A, and the other leg 28B of the "U" engaging a groove 12B formed in pipe 10B. The inner surface of the U-shaped housing defines a groove that is sized and shaped to receive a portion of the gasket 40.

In the illustrated embodiment, the housing 25 is not in rigid contact with the pipes 10A,B so that the pipes 10A,B are allowed to move or "float" a limited amount. For example, the pipes may be allowed to expand axially until the edge of the grooves contact an edge of the housing 25. As will be understood by those skilled in the art, the housing legs 28A,B may be configured to contact the pipe grooves to form a rigid connection if desired.

Turning to FIGS. 4-7, the gasket 40 is an annular ring having a substantially C-shaped cross-section. The gasket 40 may be made of an elastomer material such as EPDM, nitrile, fluoro-elastomer or silicon. The gasket may be produced using an injection, extrusion or compression molding process.

Figure 6:
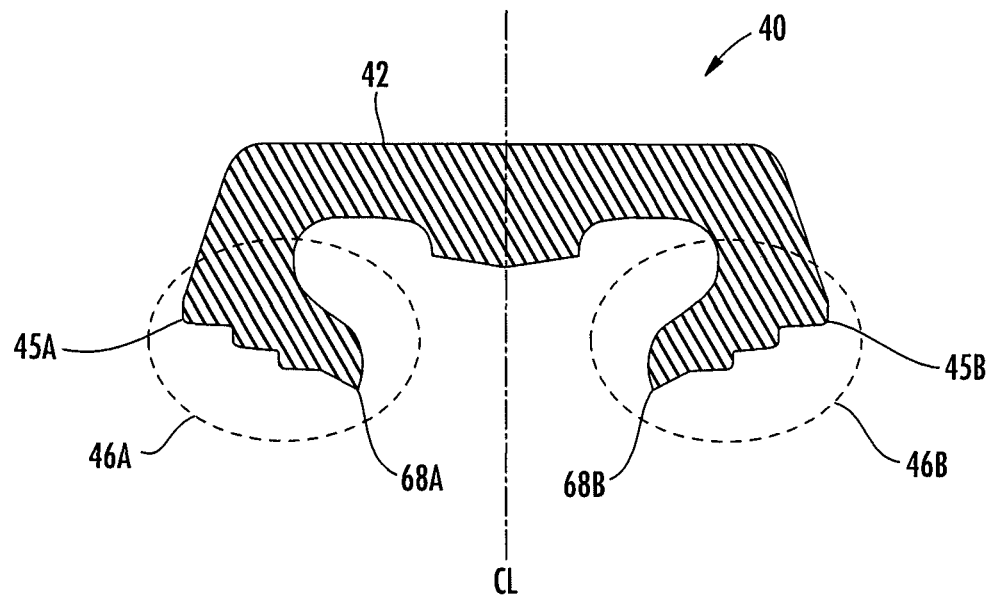
FIG. 6 is an enlarged view of the cross-section of the gasket 40 shown in FIGS. 4 and 5.

FIG. 6 illustrates the unique cross-section of the gasket 40 in accordance with an embodiment of the present invention. The gasket 40 has a generally C-shaped cross-section and is substantially symmetrical about the centerline CL of the gasket. The gasket 40 includes a housing interface portion 42 and two pipe interface portions 46A,B. The housing interface portion 42 generally extends from edge 45A to edge 45B along the outer surface of the C-shaped gasket 40. This portion of the gasket is sized and shaped to engage the inner surface of the housing 25 as generally shown in FIG. 3.

The pipe interface portions 46A,B are located proximate the tips 68A,B of the C-shaped cross-section of the gasket 40 and are configured to resiliently engage pipe outer surfaces. It should be noted that the pipe interface portions 46A,B in the illustrated embodiment are substantial mirror images of one another. Accordingly, the following discussions regarding concepts embodied in the interface portion 46A will also apply to 46B. However, it should be understood that other embodiments of the present invention may include pipe interface portions that are not mirror images.

Figure 7:
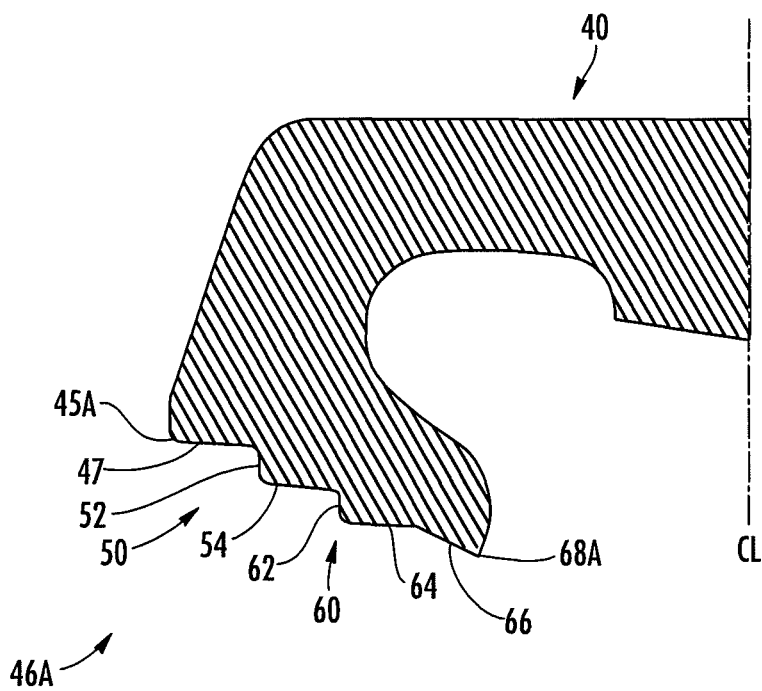
FIG. 7 is an enlarged view of a cross-section of the pipe interface portion 46A of the gasket 40 shown in FIGS. 4-6.

FIG. 7 provides an enlarged view of the interface portion 46A. The interface portion 46A extends generally along the outer surface of the gasket 40 from the leading edge 45A and terminates at tip 68A. For the illustrated embodiment, the interface portion 46A includes two tapered rib features 50, 60. Leading into the first rib feature 50 is a horizontal section 47 that is oriented substantially perpendicular to and directed towards the centerline CL of the gasket 40. The first rib feature 50 includes a first vertical component 52 and a first horizontal component 54. The first vertical component 52 extends from the horizontal section 47 in a downward direction and terminates at the edge of the first horizontal component 54. The first horizontal component 54 extends towards the centerline CL such that the vertical component 52 and horizontal component 54 are substantially perpendicular. In various embodiments, the first vertical component 52 may also be substantially parallel with the centerline CL of the gasket 40. As will be understood by those skilled in the art, the tapered rib feature is designed such that the vertical component 52 engages the pipe during installation.

The second rib feature 60 includes a second vertical component 62 and a second horizontal component 64. The second vertical component 62 extends substantially perpendicularly from the termination point of the first horizontal component 54 in a downward direction and extends to the edge of the second horizontal component 64. The second horizontal component 64 extends towards the centerline CL. The second vertical component 62 may be substantially perpendicular to the second horizontal component 64. A tapered section 66 extends downward in an obtuse angle from the second horizontal section 64 and terminates at the tip 68A. Although the illustrated embodiment shows two tapered rib features, it should be understood that other embodiments may comprise one or more tapered rib features. Furthermore, the figures illustrate the rib features themselves as being asymmetrical (e.g., horizontal component longer than respective vertical component); however, other embodiments may be symmetrical. As will be understood by those skilled in the art, the tapered rib feature is designed such that the vertical component 62 engages the associate pipe during installation.

Figure 8:
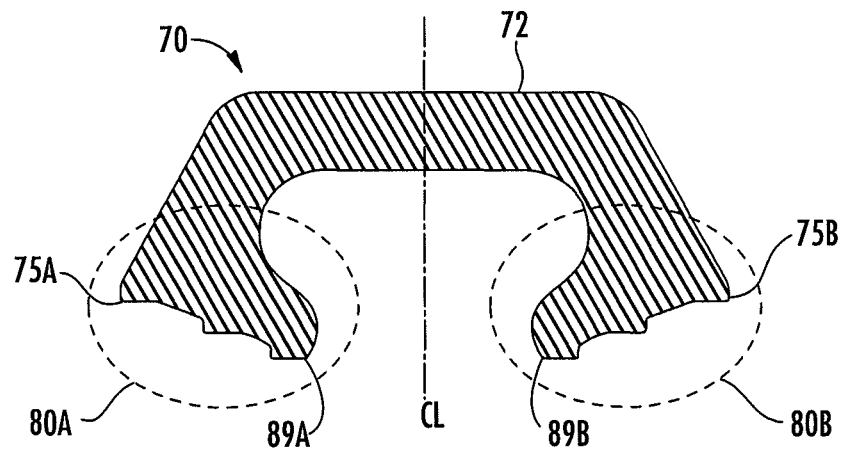
FIG. 8 is a cross-section view of a gasket 70 in accordance with another embodiment of the present invention.

FIG. 8 illustrates the cross-section of another embodiment of the gasket 70. The gasket 70 is an annular ring with a substantially C-shaped cross-section. The C-shaped cross-section is substantially symmetrical about the centerline CL.

The gasket 70 includes a housing interface portion 72, which extends along the outer surface of the C-shaped gasket from edge 75A to edge 75B. Also included in the gasket 70 design are two pipe interface portions 80A,B that extend from the edge 75A,B to the tips 89A,B, respectively, of the C-shaped gasket. The pipe interface portions 80A,B are configured to resiliently engage the pipe surfaces. It should be noted that the pipe interface portions 80A,B are substantial mirror images of one another. Accordingly, the following discussions regarding the profile of the interface portion 80A will also apply to interface portion 80B. However, it should be understood that other embodiments of the present invention may include pipe interface portions that are not mirror images.

Figure 9:
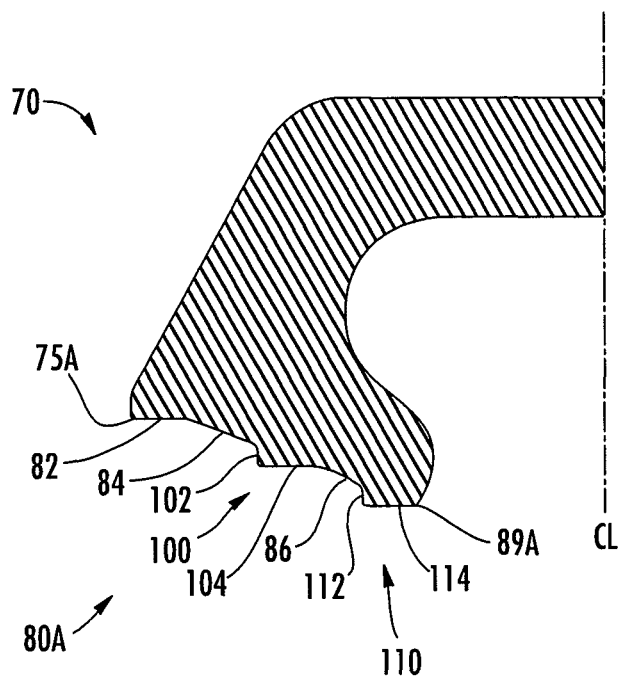
FIG. 9 is a cross-section view of a pipe interface portion 80A of the gasket 70 shown in FIG. 8.

FIG. 9 provides an enlarged view of the interface portion 80A. As illustrated, the interface portion 80A includes two rib features 100, 110. Leading into the first rib feature 100 is a horizontal section 82, which extends from edge 75A towards the centerline CL of the gasket. Extending from the horizontal section 82 is a first transition surface 84, which extends downwardly at an obtuse angle with respect to the horizontal section 82 and generally towards the centerline CL. The first rib feature 100 has a first vertical component 102 and a first horizontal component 104, where the first vertical component 102 may be substantially parallel with the centerline CL of the gasket 70. The first vertical component 102 extends from the first transition surface 84 in a downward direction and terminates at the edge of the first horizontal component 104. The first horizontal component 104 extends towards the centerline CL in an orientation substantially parallel to the first horizontal section 82. In the illustrated embodiment, the first vertical and horizontal components are substantially perpendicular. Extending from the termination of the first horizontal component 104 is a second transition surface 86, which extends at an obtuse angle therefrom. As will be understood by those skilled in the art, the tapered rib feature is designed such that vertical component 102 engages the pipe during installation.

The second rib feature 110 includes a second vertical component 112 and a second horizontal component 114. The second vertical component 112 extends from the termination point of the second declined section 86 in a downward direction and extends to the edge of the second horizontal component 114. The second horizontal component 114 extends towards the centerline CL in an orientation substantially parallel to the first horizontal section 82 and terminates at tip 89A. Although the embodiment illustrated in FIGS. 8 and 9 includes two tapered rib features, it should be understood that other embodiments may include one or more tapered rib features.

Figure 10:
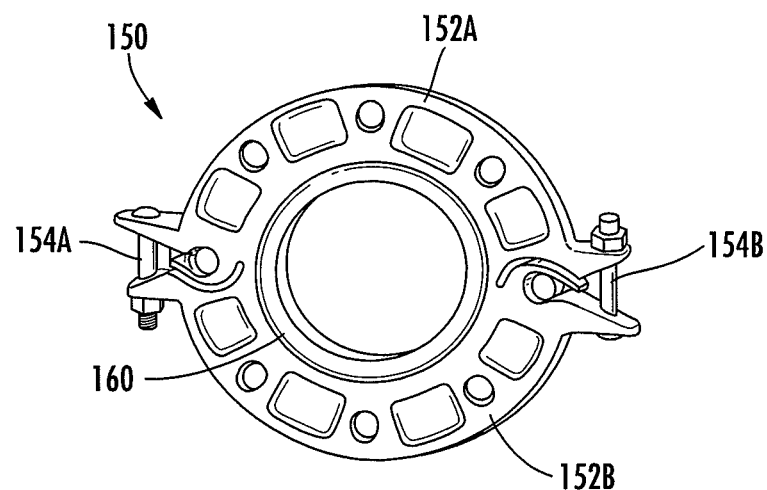
FIG. 10 is a pictorial view of a flange coupling device.

FIG. 10 illustrates a flange coupling device 150 in accordance with an embodiment of the present invention. Flange couplings are used to provide a fluid tight seal between a pipe end and a mating flange. The illustrated flange coupling 150 includes two housing segments 152A,B and two fasteners 154A,B for securing the segments together. The flange coupling device 150 also includes an annular gasket 160 for providing the fluid tight seal. The gasket 160 is an annular ring has an asymmetrical cross-section.

Figure 11:
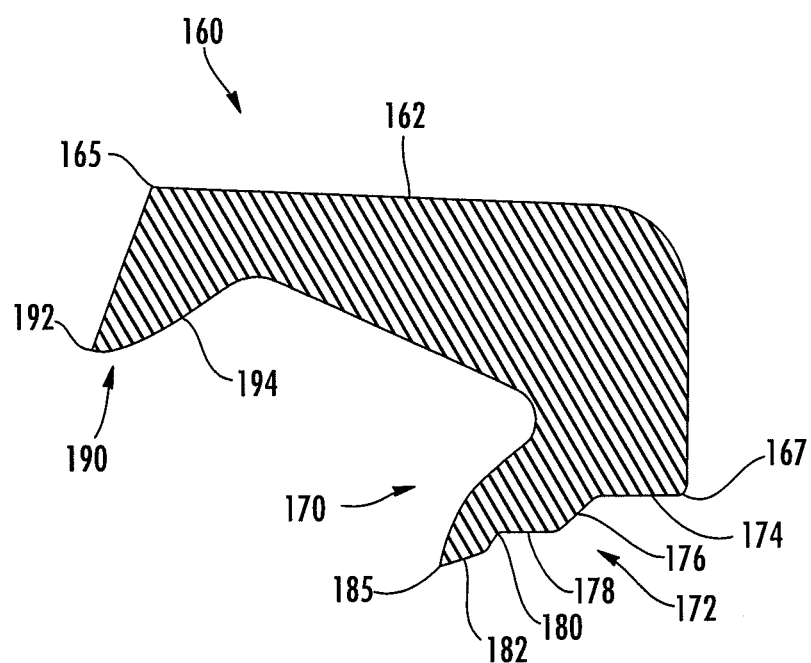
FIG. 11 is a cross-section view of the gasket 160 shown in FIG. 10.

FIG. 11 illustrates the cross-section of the gasket 160, which includes a housing interface portion 162, a pipe interface portion 170 and a flange interface portion 190. The housing interface portion 162 is substantially L-shaped and extends from edge 166 to edge 167 along the outer surface of the gasket 160. This portion of the gasket is sized and shaped to engage the inner surface of the housing segments 152A,B. The pipe interface portion 170 extends from edge 167 to tip 185 and is configured to resiliently engage the outer surface of the pipe being joined.

In the illustrated embodiment, the pipe interface portion 170 includes a tapered rib feature 172, which comprises a declined component 176 and a horizontal component 178. Leading into the tapered rib feature 172 is a first horizontal section 174 that extends from edge 167 and is oriented substantially perpendicular to the adjacent housing interface portion. This horizontal section 174 terminates into the first declined section 176 of the tapered rib feature 172. The declined component 176 is oriented at an obtuse angle with respect to the horizontal section 174 and terminates in the horizontal component 178 of the tapered rib feature 172. The horizontal component 178 is substantially parallel to the horizontal section 174. The horizontal component 178 terminates in a radius 180, which itself terminates in a declined section 182. The declined section 182 terminates at the tip 185. Although the illustrated embodiment shows a single tapered rib feature, it should be understood that other embodiments may comprise one or more tapered rib features.

The flange interface portion extends from edge 165 to tip 192 at an obtuse angle from the adjacent housing interface portion. The flange interface portion extends into a radius 194 which extends inwardly.

Methods of Use

As noted, various embodiments of the coupling device 20 may be used to join two pipes. As a first step in installing the coupling device 20, a lubricant, such as grease, is applied to the interface portions 46A,B of the gasket 40. The gasket 40 is then slid onto the outer surface of pipe 10A such that both interface portions 46A,B are in contact with the outer surface of pipe 10A. As will be understood by those skilled in the art, the vertical components of the tapered ribs on interface portion 46A engage the pipe 10A during installation.

Next, a second pipe, 10B, is placed end to end in substantial axial alignment with pipe 10A such that a gap is present between the ends. The gasket is then slid towards pipe 10B until the gasket is substantially centered over the gap between the pipe ends such that interface portion 46A is in contact with pipe 10A and interface portion 46B is in contact with pipe 10B. As will be understood by those skilled in the art, the vertical components of the tapered ribs on interface portion 46B engage the pipe 10B as the gasket is slid towards pipe 10B.

Once the gasket is positioned, each segment of the housing is positioned over the gasket and the segments loosely connected using fasteners. After all of the housing segments are positioned, the fasteners may be tightened such that each segment is rigidly connected to its adjacent segment(s). A cut-away view of a finished coupling device 20 attached to two pipes is illustrated in FIG. 2.

As is apparent by the installation procedure described above, the gasket is repositioned several times during the coupling process. A benefit of the unique ribbed profiles described herein is that a portion of the applied grease may be retained between the two ribs as well as between the ribs and other features such as the leading edge 45 and tip 68A. This creates a small reservoir that can replenish grease or other lubricant to the surface of the pipe over time to improve the durability of the seal.

Figure 12:
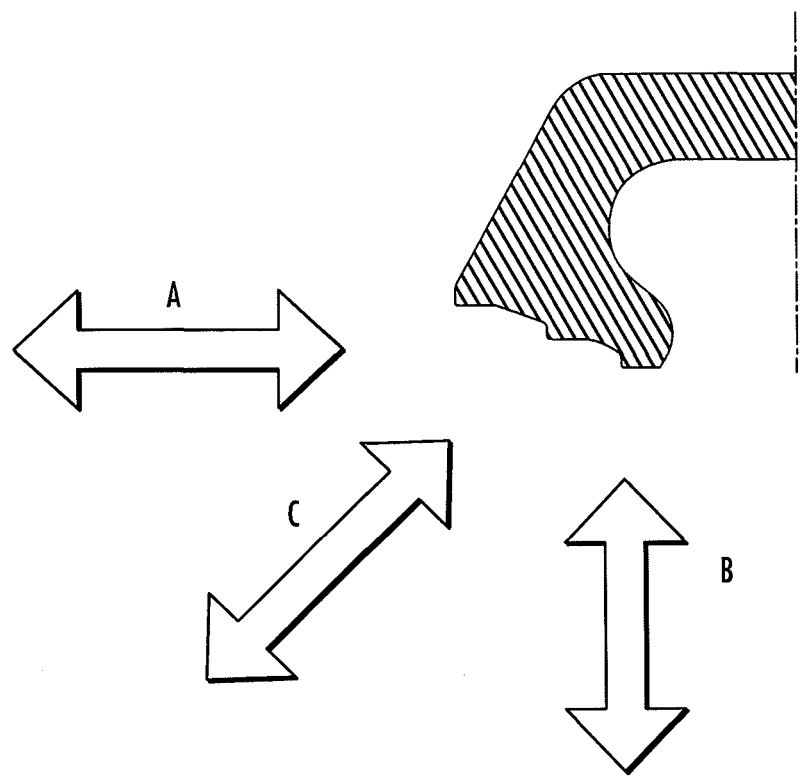
FIG. 12 is a schematic diagram of a gasket illustrating some options for movement of mold components used in creating an injection molded gasket.
Figure 13A:
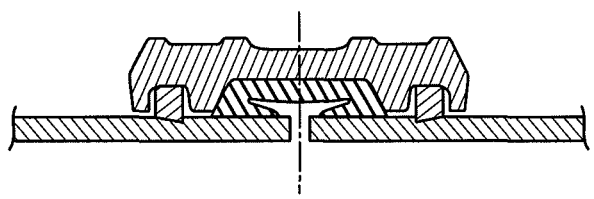
Figure 13B:
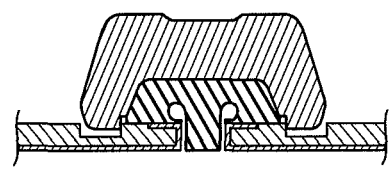
Figure 13C:
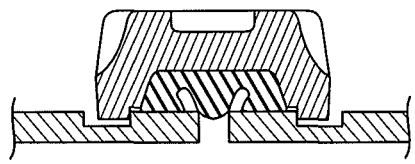
Figure 13D:
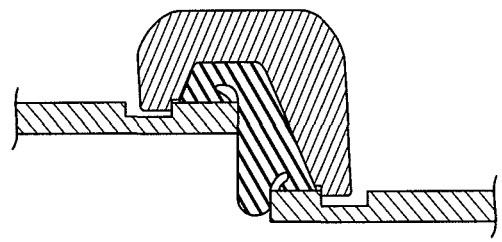
Figure 13E:
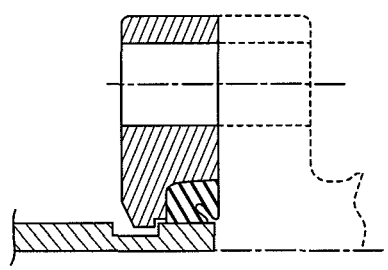

An additional benefit of the tapered rib geometry is that it adds flexibility to the design of molds needed to create the gasket. As one of ordinary skill in the art will appreciate, an injection mold may open and close in a direction substantially parallel ("B") or perpendicular ("A") to the centerline of the gasket as generally shown in FIG. 12 due to the tapered rib geometry profile. If other rib profiles were used, the mold would likely have to open and close in direction "C" to reduce the chance of deformation of ribs caused by the mold dragging across the rib profile when opened to allow the gasket to be removed. It should be noted that molds used to produce gaskets with the tapered ribbed profiles describe herein may open and close in any direction between direction "A" and "B" as desired.

Many modifications and other embodiments of the inventions set forth herein will come to mind to one skilled in the art to which these inventions pertain having the benefit of the teachings presented in the foregoing descriptions and the associated drawings. For example, concepts disclosed herein may be used in conjunction with various pipe couplings marked by Anvil Industries, Inc., such as Roughneck®, End Guard®, Flush Gap®, Reducing, and Flange couplings illustrated in FIGS. 13A-E, respectively.

It is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A coupling device for joining two pipes positioned end to end in substantial axial alignment and a joint there between comprising:
    a housing having a plurality of segments, wherein the housing defines an annular groove;
    a plurality of fasteners connecting the plurality of segments together; and
    an annular gasket within the housing and having a substantially C-shaped cross-section that defines a housing interface portion and two sealing portions directed inwardly,
    wherein each of the sealing portions includes a first tapered rib and a second tapered rib, each first tapered rib and each second tapered rib having a vertical surface extending substantially in a radial direction when not engaged and a horizontal surface extending substantially in an axial direction when not engaged, wherein the vertical surface is substantially perpendicular to the horizontal surface, wherein an axial length of the horizontal surface is at least substantially as long as a radial length of the vertical surface, wherein the first tapered rib is axially inwards from the second tapered rib, wherein the horizontal surface of the first tapered rib has a diameter less than the diameter of the second tapered rib, and wherein the vertical surface of the first tapered rib has a first end that terminates at the horizontal surface of the first tapered rib and a second end that terminates at a diameter equal to or less than a diameter of the horizontal surface of the second tapered rib;
    wherein the vertical surface of the first tapered rib and the vertical surface of the second tapered rib of each of the sealing portions are substantially parallel with a cross-sectional centerline of the seal prior to engagement with the respective outer surfaces of the two pipes;
    wherein the horizontal surface of the first tapered rib of each of the sealing portions is not coannular with the horizontal surface of the second tapered rib of each of the sealing portions when not engaged;
    wherein each of the sealing portions includes a horizontal section in addition to the first tapered rib and the second tapered rib; and
    wherein the horizontal section of each of the sealing portions is radially outward from the horizontal surface of the second tapered rib and adjacent to an axially outer edge of each of the sealing portions.

2. The coupling device of claim 1, wherein the cross-section of the annular gasket is substantially symmetrical about the centerline.

3. The coupling device of claim 1, wherein the sealing portions include a transition surface extending between the vertical surface of the first tapered rib of each of the sealing portions and the horizontal surface of the second tapered rib of each of the sealing portions.

4. The coupling device of claim 1, wherein the sealing portions are asymmetrical about the centerline when not engaged.

5. The coupling device of claim 1, wherein:
    the axial length of the horizontal surface of each first tapered rib and each second tapered rib is approximately ¼ of the axial length of the sealing portion; and
    the radial length of the vertical surface of each first tapered rib and each second tapered rib is approximately ¼ of the radial length of the sealing portion.

6. An annular gasket comprising:
    a substantially C-shaped cross-section that defines a housing interface portion formed on the outer surface of the C-shaped cross-section; and
    two sealing portions formed on the outer surface of the C-shaped cross-section proximate respective termination portions of the C-shaped cross section,
    wherein each of the sealing portions includes a first tapered rib and a second tapered rib, each first tapered rib and each second tapered rib having a vertical surface extending substantially in a radial direction when not engaged and a horizontal surface extending substantially in an axial direction when not engaged, wherein the vertical surface is substantially perpendicular to the horizontal surface, wherein an axial length of the horizontal surface is at least substantially as long as a radial length of the vertical surface, wherein the first tapered rib is axially inwards from the second tapered rib,
    wherein the horizontal surface of the first tapered rib has a diameter less than the diameter of the horizontal surface of the second tapered rib;
    wherein the vertical surface of the first tapered rib has a first end that terminates at the horizontal surface of the first tapered rib and a second end that terminates at the horizontal surface of the second tapered rib;
    wherein the vertical surface of the first tapered rib extends radially inwards from the horizontal surface of the second tapered rib;
    wherein the horizontal surface of the first tapered rib of each of the sealing portions is not coannular with the horizontal surface of the second tapered rib of each of the sealing portions when not engaged;
    wherein the vertical surface of the first tapered rib intersects substantially perpendicularly with the horizontal surface of the second tapered rib;
    wherein each of the sealing portions includes a horizontal section in addition to the first tapered rib and the second tapered rib;
    wherein the horizontal section of each of the sealing portions intersects the second tapered rib and is not coannular with the horizontal surface of the second tapered rib when not engaged; and
    wherein the horizontal section of each of the sealing portions is radially outward from the horizontal surface of the second tapered rib and adjacent to an axially outer edge of each of the sealing portions.

7. The annular gasket of claim 6, wherein the cross-section of the annular gasket is substantially symmetrical about a centerline.

8. The annular gasket of claim 7, wherein the vertical surface of the first tapered rib and the vertical surface of the second tapered rib of each of the sealing portions are substantially parallel with the centerline.

9. The gasket of claim 6, wherein:
   the axial length of the horizontal surface of each first tapered rib and each second tapered rib is approximately ¼ of the axial length of the sealing portion; and
   the radial length of each first tapered rib and each second tapered rib of the vertical surface is approximately ¼ of the radial length of the sealing portion.

10. An annular gasket comprising:
   a substantially C-shaped cross-section that defines a housing interface portion formed on the outer surface of the C-shaped cross-section; and
   two sealing portions formed on the outer surface of the C-shaped cross-section proximate respective termination portions of the C-shaped cross section,
   wherein each of the sealing portions includes a first tapered rib and a second tapered rib, each first tapered rib and each second tapered rib having a vertical surface extending substantially in a radial direction when not engaged and a horizontal surface extending substantially in an axial direction when not engaged, wherein the vertical surface is substantially perpendicular to the horizontal surface, wherein an axial length of the horizontal surface is at least substantially as long as a radial length of the vertical surface, wherein the first tapered rib is axially inwards from the second tapered rib, wherein the vertical surface of the first tapered rib extends radially inwards from the horizontal surface of the second tapered rib, wherein the horizontal surface of the first tapered rib has a diameter less than the diameter of the horizontal surface of the second tapered rib;
   wherein the vertical surface of the first tapered rib has a first end that intersects the horizontal surface of the first tapered rib and a second end that intersects a transition surface between the first tapered rib and the second tapered rib, the transition surface extending at least partially radially inward from the horizontal surface of the second tapered rib;
   wherein the vertical surface of the first tapered rib and the vertical surface of the second tapered rib of each of the sealing portions are substantially parallel with the centerline prior to engagement with the respective outer surfaces of the two pipes;
   wherein the horizontal surface of the first tapered rib of each of the sealing portions is not coannular with the horizontal surface of the second tapered rib of each of the sealing portions when not engaged;
   wherein each of the sealing portions includes a horizontal section in addition to the first tapered rib and the second tapered rib;
   wherein the horizontal section of each of the sealing portions is radially outward from the horizontal surface of the second tapered rib and adjacent to an axially outer edge of each of the sealing portions; and
   wherein a second transition surface extends at least partially radially inward from the horizontal section of each of the sealing portions to intersect the vertical surface of the second tapered rib of each of the sealing portions.

\* \* \* \* \*